United States Patent [19]

Hasegawa

[11] 4,269,883

[45] May 26, 1981

[54] REINFORCED VENEER AND METHOD OF REINFORCING A VENEER SHEET

[75] Inventor: Katsuji Hasegawa, Ohbu, Japan

[73] Assignee: Meinan Machinery Works, Inc., Ohbu, Japan

[21] Appl. No.: 63,533

[22] Filed: Aug. 3, 1979

[30] Foreign Application Priority Data

Aug. 17, 1978 [JP] Japan ................................ 53-100731

[51] Int. Cl.$^3$ ........................ B32B 21/10; B32B 21/14; B27D 5/00

[52] U.S. Cl. .................................... 428/120; 428/138; 428/192; 428/194; 428/198; 428/103; 428/104; 428/378; 428/379; 428/392; 428/395; 428/396; 428/537; 156/92; 156/166; 156/252; 156/305; 156/307.3; 156/307.5; 156/307.7; 144/318

[58] Field of Search ................... 156/304, 157, 93, 92, 156/252, 166, 176, 305, 307.3, 307.5, 307.7; 144/309 W, 318; 428/52, 61, 54, 56, 223, 119, 120, 138, 198, 194, 378, 379, 395, 392, 396, 537

[56] References Cited

U.S. PATENT DOCUMENTS

| | | | |
|---|---|---|---|
| T896,014 | 3/1972 | Huffaker et al. | 428/61 |
| 1,744,203 | 1/1930 | Becker | 144/318 |
| 3,579,405 | 5/1971 | Crawford | 156/304 X |
| 3,705,829 | 12/1972 | Brenneman et al. | 156/304 X |
| 3,856,600 | 12/1974 | Fields | 156/93 |
| 4,042,440 | 8/1977 | Hasegawa et al. | 156/304 |
| 4,044,182 | 8/1977 | Aizawa | 428/60 X |

*Primary Examiner*—George F. Lesmes
*Assistant Examiner*—Alexander S. Thomas
*Attorney, Agent, or Firm*—Lackenbach, Lilling & Siegel

[57] ABSTRACT

A veneer sheet reinforced with at least one piece of cord is provided. The cord is thrust through the sheet at appropriate intervals and projects from either side of the sheet. The projecting portions are fastened by deforming the cord or applying an adhesive including a thermoplastic resin, a thermosetting resin, and a wetsetting resin.

27 Claims, 21 Drawing Figures

REINFORCED VENEER AND METHOD OF REINFORCING A VENEER SHEET

BACKGROUND OF THE INVENTION

The present invention relates to a reinforced veneer and a method of reinforcing a veneer sheet cut from a imperfect log.

A veneer sheet cut from an imperfect log is found to have split portions. Due to the veneer sheet being thin, such splits are apt to develop during plywood manufacturing. If such splitting occurs excessively, alignment prior to the plywood manufacturing process becomes difficult.

Conventional methods proposed to overcome the problem in handling a weak or split veneer sheet include a method in which a tape is pasted on abutting ends of two adjoining veneer sheets (U.S. Patent Office Defensive Publication T 896,014), a method in which adhesive impregnated strands are pressed onto trained veneer sheets to join them (U.S. Pat. No. 4,042,440) or a method in which a veneer sheet is provided on its surface with inclined grooves or slits in which strings are imbedded and fastened by adhesive (U.S. Pat. No. 4,044,182). The first two methods are based on bond strength between the veneer sheets and the adhesive, and bond strength between the adhesive and the binder such as a tape, a strand, or the like.

It is, however, often found that the bonding strength between the veneer sheets and the adhesive is affected by humidity, surface quality, or grain condition of the sheet so that sufficient joining or reinforcing cannot be obtained.

The third method has a disadvantage in that, the forming of slits on the surface, sacrifices the strength of each veneer strip to connect a plurality of strips.

SUMMARY OF THE INVENTION

With a view to overcoming the drawbacks of the prior art, there is provided a reinforced veneer sheet and a method of reinforcing a veneer sheet. On one side of the veneer sheet, at least one piece of cord extends therethrough. The cord is thrust through the veneer sheet thickness in a pluality of intervals such that the thrust cord projects from either side at intervals on the veneer sheet. Then, a plurality of fastening objects are formed on the projecting portions of the cord. Said objects have a size larger than the cord diameter. In another aspect of the present invention, there is also provided another method of reinforcing a veneer sheet. In this method, a veneer sheet thickness is perforated at intervals to form holes therethrough. Then, the cord extending on one side of the veneer sheet is pulled through the holes to the other side of the sheet such that the pulled portions of the cord project from the side of the sheet. Then, a fastening object is formed on the projecting portion of the cord.

DETAILED DESCRIPTION OF THE PREFERRED EMBODIMENTS

Figure 1:
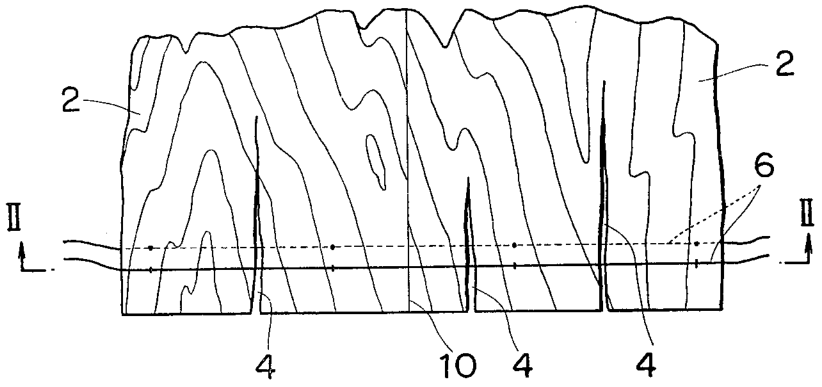
FIG. 1 is a fragmental plan view of reinforced veneer sheets according to the present invention.
Figure 2:
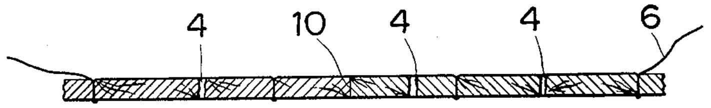
FIG. 2 is a sectional view of the reinforced veneer sheet shown in FIG. 1 taken along the line II—II.
Figure 3:
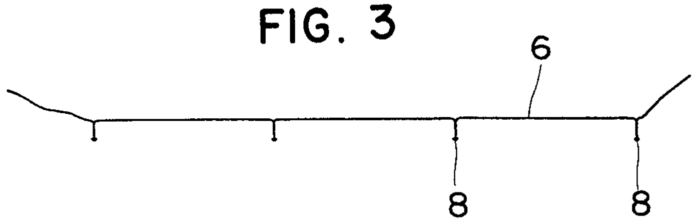
FIG. 3 is an illustration of a cord reinforcing the veneer sheets with a side view of the sheet omitted.
Figure 4:
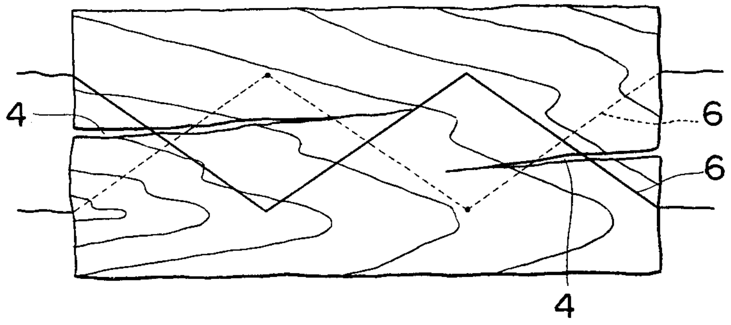
FIG. 4 is another fragmental plan view showing another example of a reinforced veneer sheet.

Referring to FIGS. 1 to 4, numeral 2 shows cracked veneer sheets. The veneer sheets have splits 4 running substantially along the grain of the sheet. Such veneer sheets are aligned together with their edges in abutting engagement. Along a butt end, a piece of cord 6 extends on each side of veneer sheet 2. Cord 6 is thrust through veneer sheet thickness at an appropriate interval such that the thrust portions project from the other side of sheet 2. Upon the projecting portions, fastening means 8 are formed to prevent the thrust cord from being withdrawn from veneer sheet 2. The size of the fastening means is preferably greater than the diameter of cord 6. Numeral 10 designates abutting ends of veneer sheets 2.

Cord 6 is a thread of synthetic fiber such as thermoplastic polyester, polyamide, or the like, but a thread of natural fiber such as cotton, silk, or metal wires of mild steel, copper, or the like can be used.

Fastening means 8 is preferably larger in size than the diameter of cord 6. The thrust portion of cord 6 and fastening means 8 provide a T-shaped configuration or a mushroom configuration in combination. If cord 6 is a thread of the above-specified synthetic fiber, said fastening means 8 can be formed by melting and deforming the projecting portions of thrust cord 6 by heat pressing. If cord 6 is a thread of natural fiber, it is impregnated with an adhesive such as a thermoplastic resin, thermosetting resin, or wet-setting resin and after being thrust through the sheet, is subjected to a cold pressing step, a heat pressing step, or a wet pressing step according to the nature of the adhesive, to set the projecting portions. Otherwise, an adhesive such as a thermoplastic resin, thermosetting resin, or wet-setting resin may be applied onto the projecting portions of cord 6 and be subjected to a cold pressing step, a heat pressing step, or a wet pressing step. If a quicksetting adhesive is used, no particular setting step is needed. If cord 6 is a metal wire, it is coated with an adhesive such as a thermoplastic resin, thermosetting resin, or wet-setting resin of polyurethane, and after being thrust through the sheet, is then subjected to a cold pressing step, a heat pressing step or a wet pressing step. Otherwise, an adhesive such as a thermoplastic resin, thermosetting resin, or wet-setting resin of polyurethane may be applied onto the projecting portions of cord 6 and be subjected to a cold pressing step, a heat pressing step, or a wet pressing step.

The distance between two adjacent fastening means 8 may be designed according to the split condition of veneer sheet 2. In practice, the distance varies from 5 mm to 10 mm.

Veneer sheet 2 may be reinforced by arranging cords 6 along a butt end of veneer sheet 6 on both sides as shown in FIG. 1 or in a zigzag fashion on both sides as shown in FIG. 8 such that a reinforced area concentrates on splits 4.

Figure 5A:
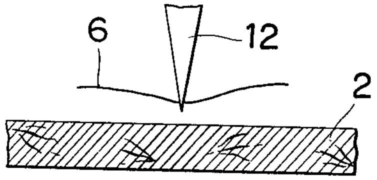
FIGS. 5A to 5D are illustrations showing method of reinforcing a veneer sheet according to the present invention.
Figure 5B:
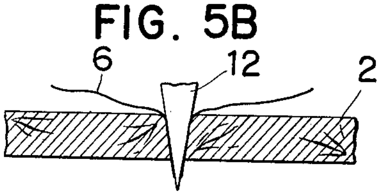
Figure 5C:
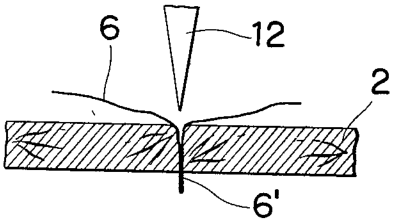
Figure 5D:
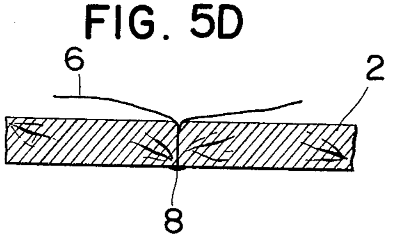
Figure 6:
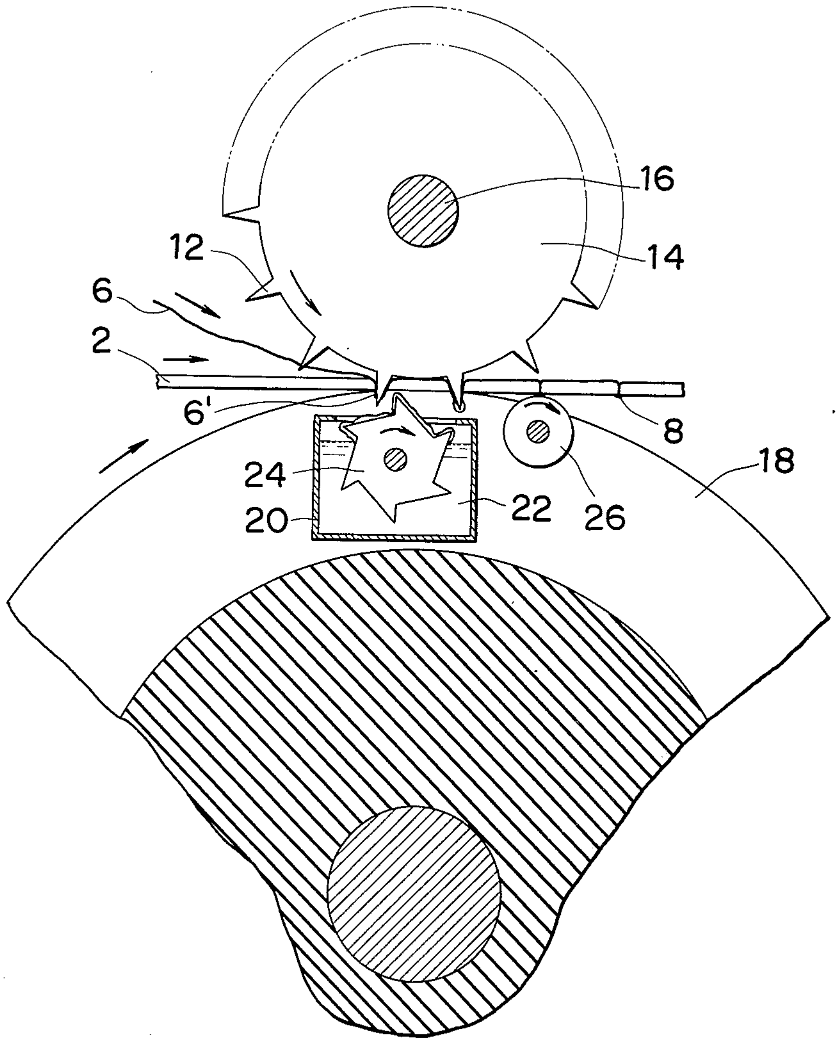
FIG. 6 is a sectional side view showing a device for putting the method of FIGS. 5A to 5D into practice.
Figure 7:
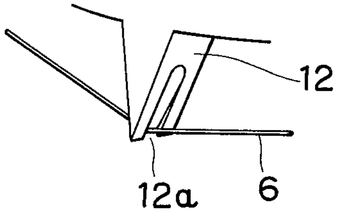
FIG. 7 is a perspective view illustrating a thrusting member mounted on the roll of the device shown in FIG. 6 and a cord in engagement with the thrusting member.

Referring to FIGS. 5A to 14, an explanation of the methods for reinforcing a veneer sheet will be given. FIGS. 5A to 5D show a basic idea of steps taken in one example. On one side of veneer sheet 2, cord 6 is extended (FIG. 5A). The cord 6 is thrust through veneer sheet 2 in the direction of its thickness with thrust member 12 such that part of thrust cord projects from the other side of veneer sheet 2 (FIG. 5B). The thrust member 12 is drawn out of veneer sheet 2 (FIG. 5C). Fastening object 8 having a size larger than a diameter of cord 6 is formed on projecting portion 6' of thrust cord (FIG. 5D). In practice, veneer sheet 2 is fed from left in FIG. 6 and the feed is continued by driving rubber roll 18. Substantially above said driving rubber roll 18, roll 14 having thrust member 12 mounted thereon is provided. Axle 16 of the roll 14 is connected to a driving source (not shown) which operates in synchronization with driving rubber roll 18. However, said axle 16 may be adapted to idle. Between the roll 14 and veneer sheet 2, cord 6 extends. The cord 6 is a thread of natural or synthetic fiber. Around the driving rubber roll, there are provided a plurality of grooves. In said grooves, there are provided containers 20 containing a thermosetting adhesive 22. In each container 20, adhesive transferring member 24 is rotatably supported dipping in said adhesive 22. A projection of the adhesive transferring member 24 is in interference with thrust member 12 mounted on roll 14. There is further provided in said groove heat pressing roll 26. By the rotation of roll 14, thrusting member 12 mounted thereon thrusts cord 6 through veneer sheet 2 such that the thrust portion of cord 6 projects from the other side of sheet 2 backed by thrust member 12. Said projecting portion 6' of cord 2 comes into abutting engagement with the projection of adhesive transferring member 24 to rotate the same and scrape off adhesive sticking on member 24. With the rotation of roll 14, thrust member 12 is drawn out of veneer sheet 2, leaving the thrust cord projecting from the other side of sheet 2 and carrying adhesive thereon. The adhesive carried on projecting portion 6' is heat pressed by roll 26 into a flattened layer thereon. As a result, the adhesive sets and fastening object 8 is formed. Each thrust member 12 preferably has a groove **12*a* formed on its edged top and cord 6 is guided into the groove as shown in FIG. 7**.

Figure 8A:
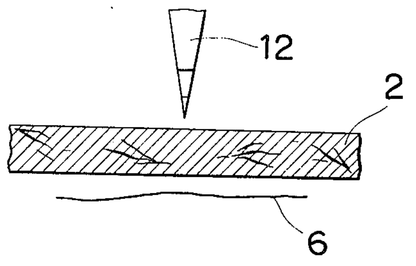
FIGS. 8A to 8E are illustrations showing another method of reinforcing a veneer sheet according to the present invention.
Figure 8B:
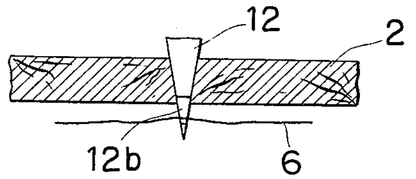
Figure 8C:
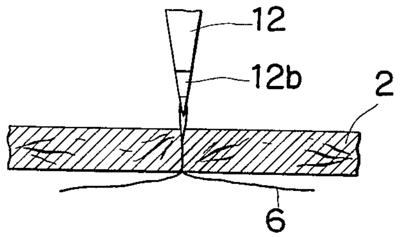
Figure 8D:
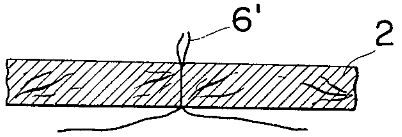
Figure 8E:
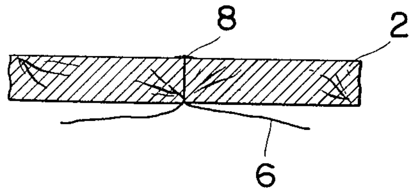
Figure 9:
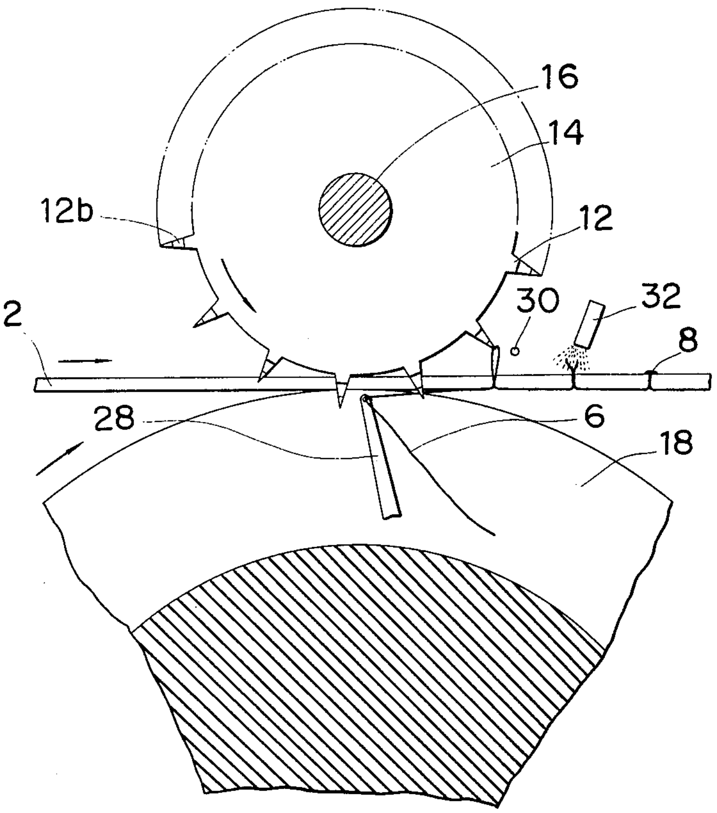
FIG. 9 is a sectional side view showing a device for putting the method of FIGS. 8A to 8E into practice.
Figure 10:
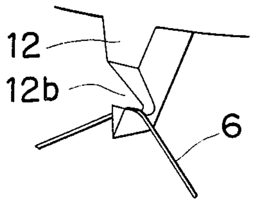
FIG. 10 is a perspective view illustrating a thrusting member mounted on the roller of the device shown in FIG. 9 and a cord in a hooked engagement with the thrusting member.
Figure 11:
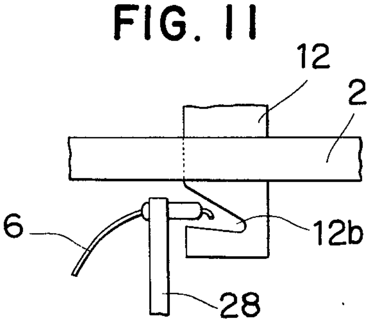
FIG. 11 is a front view of the thrusting member shown in FIG. 10 and a cord guide member for guiding the cord to be hooked around the thrusting member.

Referring to FIGS. 8A to 8E, another example is shown. On the underside of veneer sheet 2, cord 6 is extended (FIG. 8A). Then, thrust member 12 perforates veneer sheet 2 from the other side thereof to form a hole in the sheet such that the edge of thrust member 12 projects through the sheet and hooks cord 6 (FIG. 8B). Then, thrust member 12 is drawn out of veneer sheet 2, pulling cord 6 through the hole such that hooked portion of the cord projects from the upper side of veneer sheet 2 (FIG. 8C). Then, thrust member 12 unhooks cord 6, leaving cord 6 held by veneer sheet 2 as depicted (FIG. 8D). Fastening member 8 having a size larger than the diameter of cord 6 is formed on the projecting portion 6' of cord 6 (FIG. 8E) in the form of a flattened layer. In practice, veneer sheet 2 is fed from the left in FIG. 9 and the feed is continued by driving rubber roll 18. The general structure of the device shown in this figure is substantially the same at that of FIG. 6 except that cord 6 extends between rubber roll 18 and veneer sheet 2. Said cord is a thread of natural or synthetic fiber and is impregnated with a thermosetting adhesive. The edge of thrust member 12 has a notched portion **12*b* (FIG. 10) to hook cord 6 and pull the same through a hole formed in the veneer sheet by thrust member 12. For ease of hooking cord 6, there is provided cord guide member 28 in the groove formed on roll 18 as shown in FIG. 9 and FIG. 11. On the other side of rubber roll 18, there is further provided an electric heat wire 30 transversely stretched in the vicinity and downstream of roll 14. There is further provided hot jet projector 32 downstream of said electric heat wire 30 to set the adhesive impregnated in cord 6. Therefore, cord 6 is preferably a thread of natural fiber, or a thread of natural fiber and synthetic fiber. With the rotation of rubber roll 18, veneer sheet 2 is moved from left to right, causing thrust member 12 to pierce veneer sheet 2. Thrust member 12 projects from the opposite side of the sheet such that notched portion 12*b* hooks cord 6 impregnated with thermosetting adhesive and pulls the same through a hole formed by thrust member 12 in veneer sheet 2. With the further rotation of rubber roll 18, roll 14 also rotates so that thrust member 12 is drawn out of sheet 2 with cord 6. The cord 6 contacts electric heat wire 30 and is broken with the result that it goes out of hooking engagement with the notched portion of thrust member 12. Then, the projecting portion of cord 6 is subjected to a heat setting step under hot jet projector 32. Thus, a thermosetting adhesive impregnated in cord 6 is set to form a fastening object. With the repetition of the foregoing procedures, veneer sheet 2** is reinforced with a plurality of fastening objects.

Figure 12:
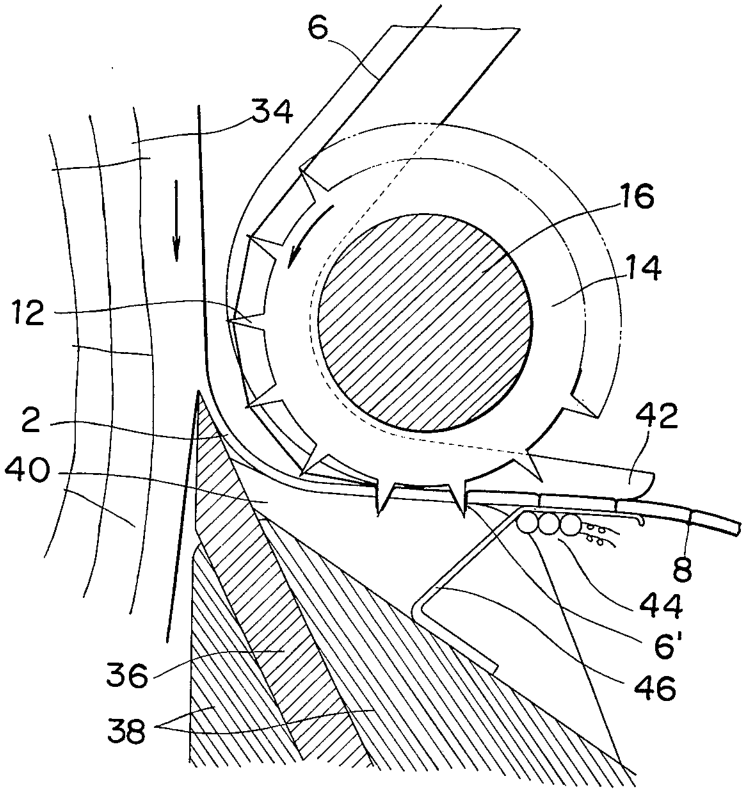
FIG. 12 is a side view of another example of a device for putting the method of FIGS. 5A to 5D into practice.
Figure 13:
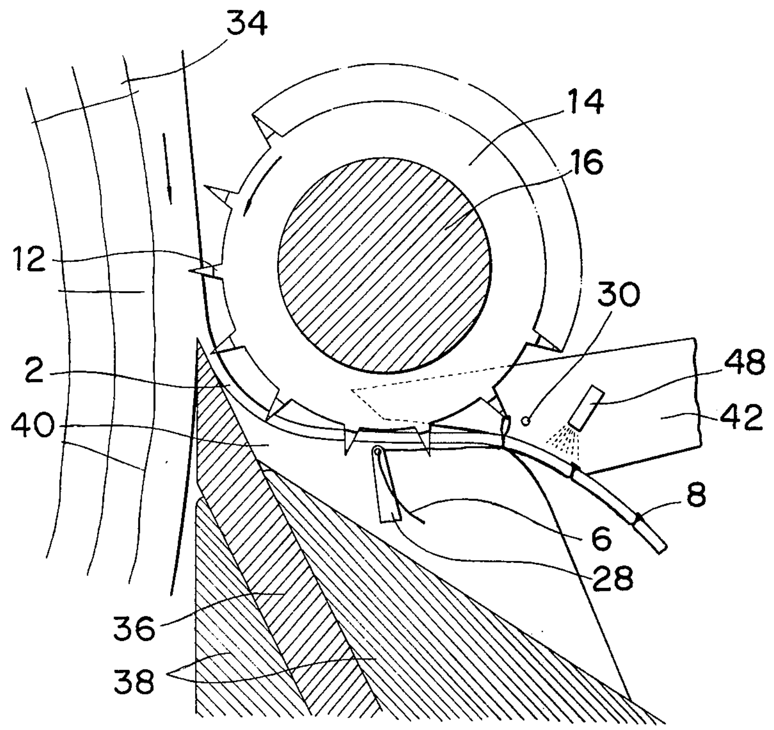
FIG. 13 is a side view of another example of a device for putting the method of FIGS. 8A to 8E into practice.

The present invention can effectively be applied in any stage of a plywood production line. Referring to FIG. 12, it is shown how the first idea is put into practice in combination with a veneer lathe. That is, roll 14 as shown in FIG. 6 is disposed in facing relation to log 34 which is axially rotatably supported. Axle 16 of the roll 14 is adapted for idle rotation. Roll 14 has thrust members mounted around the periphery thereof in a plurality of rows. Between the rows, roll 14 is formed with grooves to receive upper veneer guides 42. Between roll 14 and log 34, there is provided knife 36 held by knife supports 38 in a tangential relation to log 34 to cut off a veneer sheet therefrom. Upon knife support 38, there are provided lower veneer guides 40 in staggered relation to the rows of thrust members 12 on rolls 14. Further upon knife support 38, there is provided resilient veneer pressing member 46 backed by heaters 44. Between said thrust members 12 and cut veneer sheet 2, there are extended plural rows of cords 6 impregnated with a thermosetting adhesive. Said cord is a thread of natural or synthetic fiber. In operation, when log 34 is turned, veneer sheet 2 is cut off from log 34 by tangential knife 36. The veneer sheet 2 is guided between lower veneer guide 40 and upper veneer guide 42 to be penetrated by cords 6 which is, in turn, backed by said rows of thrust members mounted on roll 14 in staggered relation to lower and upper veneer guides 40 and 42. With a continued operation of the veneer lathe, veneer sheet 2 is moved from left to right in FIG. 12. During the movement, thrust cord 6 projects from the lower side of veneer sheet 2 as depicted. After a further movement, thrust member 12 is withdrawn from veneer sheet 2, leaving thrust cord projecting from the lower side of the sheet. A further movement of the sheet subjects said projecting portion 6' of cord 6 to a heat pressing treatment by resilient pressing member 46 backed by heaters 44 to deform the projecting portions 6' of adhesive impregnated cord 6 in a flattened form. Each of the thus deformed projecting portions 6' makes a fastening object for cord 6. Referring now to FIG. 13, it is shown how another idea is put into practice in combination with a veneer lathe. That is, roll 14 as shown in FIG. 9 is disposed in facing relation to log 34 which is axially rotatably supported. A general structure of this device is similar to the structure of the device used for practicing the first idea except for the following points. Thrust member 12 has a notched portion **12*b* as depicted in FIG. 10 and FIG. 11. Cord 6 which is impregnated in advance with a thermosetting adhesive is guided by guide 28 to the lower side of veneer sheet 2 between each two adjacent lower veneer guides 40. Said guide 28 is supported by appropriate means between the two lower veneer guides 40. Above the upper side of veneer sheet 2, there is provided an electric heat wire 30 transversely stretched in the proximity and downstream of roll 14. Further downstream of said heat wire 30, there is provided a hot jet projector 48. The operation of this embodiment is substantially the same as the embodiment of FIG. 9**, except that the veneer sheet is fed immediately after the cutting operation of the veneer lathe.

Figure 14:
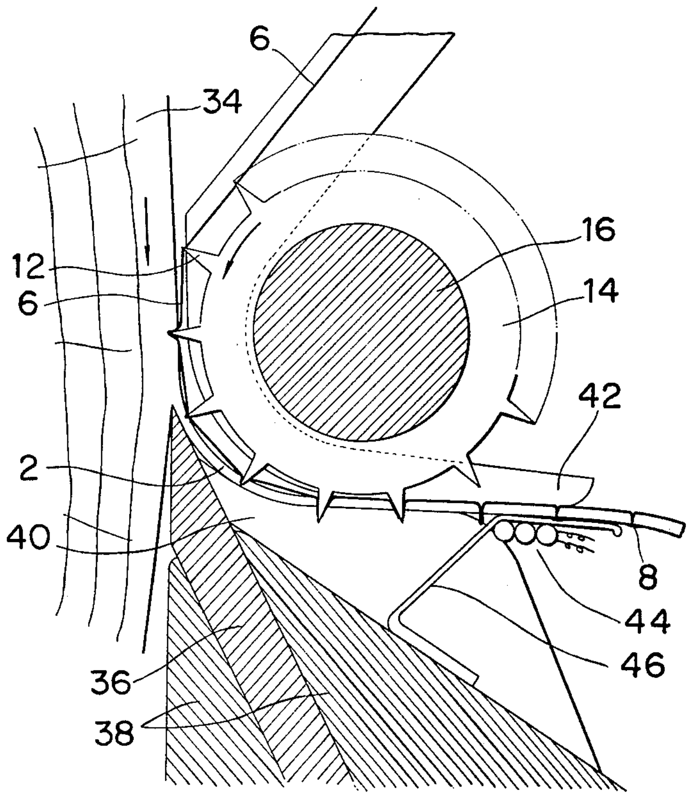
FIG. 14 is a side view of a further example of a device for putting the method of FIGS. 5A to 5D into practice.

The present invention can also be applied to reinforcement of a log per se which is about to be cut into veneer sheets. Referring to FIG. 14, a device which is substantially the same as that shown in FIG. 12, except that the adhesive impregnated cord 6 is thrust by thrust member 12 into log 34 before said log 34 is cut. After the log is cut by knife 36, thrust cord 6 projects from the lower side of cut veneer sheet 2. After a further movement of cut veneer sheet 2, thrust member 12 is withdrawn from the sheet, leaving the thrust portion of cord 6 projecting from the lower side of the sheet. Then, the projecting portion of adhesive impregnated cord 6 is subjected to a heat pressing treatment. Thus, in this embodiment, the log is reinforced before being cut, preventing a defective log surface from dropping before the cutting operation. Thereafter, cut veneer sheet 2 is also reinforced.

In the embodiments of FIGS. 12, 13 and 14, roll 14 is adapted for idling but it may be replaced with a driven roll. Moreover, said cord 6 is impregnated with a thermosetting adhesive. However, a thermoplastic adhesive can be used if the heat treatment for setting the adhesive is replaced by cooling treatment. In case cord 6 is a synthetic fiber thread such as a thermoplastic polyester or polyamide, the projecting portions 6' of cord 6 can be deformed into a fastening object through the heat treatment even if cord 6 is not impregnated with adhesive.

The objects of this invention, and the construction and advantages thereof will be apparent from the foregoing description. The invention is not limited to the specific embodiment described but includes various modifications within the scope of the appended claims.

What is claimed is:

1. A reinforced veneer comprising (1) a veneer sheet;

(2) at least one piece of cord extending on one side of said veneer sheet, said cord being thrust through the veneer sheet thickness at appropriate intervals such that the thrust cord projects from another side of the veneer sheet; and (3) a plurality of fastening means formed on the projecting portions of the cord and having a size larger than the diameter of the cord.

2. A reinforced veneer according to claim 1, in which said cord comprises a thread of synthetic fiber selected from the group consisting of polyester fiber and polyamide fiber.

3. A reinforced veneer according to claim 2, in which the cord is impregnated with an adhesive selected from the group consisting of a thermoplastic resin, a thermosetting resin, and a wet setting resin.

4. A reinforced veneer according to claim 3, in which the fastening means is accomplished by deformation of the projecting portion of the cord.

5. A reinforced veneer according to claim 2, in which said fastening means is accomplished by deformation of the projecting portions of the cord.

6. A reinforced veneer according to claim 1, in which the cord comprises a thread of natural fiber.

7. A reinforced veneer according to claim 6 in which said fastening means include layers of an adhesive applied onto the projecting portions, said adhesive being selected from the group consisting of a thermoplastic resin, a thermosetting resin, and a wet-setting resin.

8. A reinforced veneer according to claim 1, in which the cord comprises a thread of natural fiber and synthetic fiber.

9. A reinforced veneer according to claim 1, in which the cord comprises a metal wire.

10. A reinforced veneer according to claim 9, in which the cord is coated with an adhesive selected from the group consisting of a thermoplastic resin, a thermosetting resin, and a set-setting resin.

11. A reinforced veneer according to claim 9, in which said fastening means include layers of an adhesive applied onto the projecting portions, the adhesive being selected from the group consisting of a thermoplastic resin, a thermosetting resin, and a wet-setting resin.

12. A reinforced veneer according to claim 1, in which said cord extends along a butt end of the veneer sheet on at least one side thereof.

13. A method of reinforcing a veneer comprising the steps of (1) extending at least one piece of cord along one side of a veneer sheet;

(2) thrusting the cord through the thickness of the veneer sheet at appropriate intervals such that the thrust portions of the cord project from another side of the sheet;

(3) forming a plurality of fastening objects upon the projecting portions of the cord, the fastening objects having a size sufficient to prevent the projecting portions from slipping out of the sheet; and (4) repeating steps (1) to (3).

14. A method according to claim 13, further including a step of impregnating the cord, prior to the extending step, with an adhesive selected from the group consisting of a thermoplastic resin, a thermosetting resin, and a wet-setting resin.

15. A method according to claim 14, in which said fastening object forming step includes a step of deforming said projecting portions.

16. A method according to claim 15, in which said deforming step includes a step of heat pressing the projecting portions.

17. A method according to claim 13, in which the veneer sheet is supplied directly from a veneer lathe, the cord being impregnated with a thermosetting adhesive, the fastening object forming step including a step of subjecting the projecting portions of the cord to a heating treatment.

18. A method according to claim 13, in which the fastening object forming step includes a step of applying onto the projecting portions an adhesive selected from the group consisting of a thermoplastic resin, a thermosetting resin and a wet-setting resin; and a step of setting the applied adhesive.

19. A method of reinforcing a veneer comprising steps of (1) extending at least one piece of cord on one side of a veneer sheet;
(2) perforating said veneer sheet thickness at appropriate intervals from another side of the sheet to form holes therethrough;
(3) pulling the cord through the holes from the other side of the sheet such that the pulled portions of the cord project from another side of the sheet;
(4) fastening the projecting portions of the cord; and
(5) repeating steps (1) to (3).

20. A method according to claim 19, further including, prior to the cord extending step, a step of impregnating the cord with an adhesive selected from the group consisting of a thermoplastic resin, a thermosetting resin, and a wet-setting resin.

21. A method according to claim 19, in which the veneer sheet is supplied directly from a veneer lathe, the cord being impregnated with a thermosetting adhesive, and the fastening is comprised by subjecting the projecting portions of the cord to a heat treatment.

22. A method according to claim 19 further including, prior to the cord extending step, a step of coating the cord with an adhesive selected from the group consisting of a thermoplastic resin, a thermosetting resin, and a wet-setting resin.

23. A method according to claim 22, in which the fastening object forming step comprises deforming the projecting portions of the cord.

24. A method according to claim 23, in which the deforming step comprises heat pressing the projecting portions.

25. A method according to claim 19; in which the fastening comprises applying onto the projecting portions an adhesive selected from the group consisting of a thermoplastic resin, a thermosetting resin, and a wet-setting resin; and setting the applied adhesive.

26. A method of reinforcing a veneer cut off by a veneer lathe comprising the steps of (1) extending at least one piece of cord along a periphery of a log axially rotatably supported;
(2) thrusting the cord into the log;
(3) cutting the cord embedded log with a tangential knife to cut off a veneer sheet;
(4) continuing the thrust so that the embedded cord is thrust through the veneer sheet to project from the log side of the sheet;
(5) fastening the projecting portion of the cord, to prevent the projecting portion from slipping out of the veneer sheet; and
(6) repeating steps (1) to (5).

27. A method according to claim 26, in which the cord is impregnated with a thermosetting adhesive, the fastening comprising subjecting the projecting portion of the cord to heat pressing.

* * * * *